United States Patent
Wang et al.

(10) Patent No.: US 10,847,802 B2
(45) Date of Patent: Nov. 24, 2020

(54) NEGATIVE ELECTRODE, METHOD FOR PREPARING THE SAME AND ELECTROCHEMICAL DEVICE FOR PROLONGING SERVICE LIFE OF BATTERY AND REDUCING SHORT-CIRCUIT RISK

(71) Applicant: Contemporary Amperex Technology Co., Limited, Ningde (CN)

(72) Inventors: Shiwen Wang, Ningde (CN); Qisen Huang, Ningde (CN); Huafeng Huang, Ningde (CN); Chengdu Liang, Ningde (CN)

(73) Assignee: Contemporary Amperex Technology Co., Limited

( * ) Notice: Subject to any disclaimer, the term of this patent is extended or adjusted under 35 U.S.C. 154(b) by 106 days.

(21) Appl. No.: 16/211,467

(22) Filed: Dec. 6, 2018

(65) Prior Publication Data
US 2019/0190028 A1   Jun. 20, 2019

(30) Foreign Application Priority Data
Dec. 20, 2017   (CN) .......................... 2017 1 1387971

(51) Int. Cl.
*H01M 4/13* (2010.01)
*H01M 4/62* (2006.01)
(Continued)

(52) U.S. Cl.
CPC ......... *H01M 4/628* (2013.01); *H01M 2/1646* (2013.01); *H01M 2/1673* (2013.01);
(Continued)

(58) Field of Classification Search
CPC .. H01M 4/628; H01M 4/0404; H01M 4/0421; H01M 4/0423; H01M 4/0428;
(Continued)

(56) References Cited

U.S. PATENT DOCUMENTS

2010/0104852 A1* 4/2010 Fletcher ................. B82Y 40/00
                                                        428/315.5
2011/0239446 A1  10/2011 Morishima et al.
(Continued)

FOREIGN PATENT DOCUMENTS

WO   2017/156130 A1 †   9/2017

OTHER PUBLICATIONS

Lee, Byoung H., et al. "Alucone Alloys with Tunable Properties Using Alucone Molecular Layer Deposition and Al2O3 Atomic Layer Deposition." J. Phys. Chem. C, vol. 116, pp. 3250-3257 (Jan. 9, 2012).†

*Primary Examiner* — Raymond Alejandro
(74) *Attorney, Agent, or Firm* — Forge IP, PLLC

(57) ABSTRACT

Provided are a negative electrode, a method for preparing the negative electrode, and an electrochemical device. The negative electrode includes a current collector and a negative electrode active material layer disposed on at least one surface of the current collector and comprising a negative electrode active material. A porous inorganic dielectric layer is provided on a surface of the at least one negative electrode active material layer away from the current collector; a thickness of the porous inorganic dielectric layer is 20 nm-2000 nm, and the porous inorganic dielectric layer contains no binder. The negative electrode can alleviate lithium precipitation on negative electrode surface during large-current charging, stabilize negative electrode interface, and alleviate side reaction between the negative electrode and the electrolyte, thereby improving the cycle life of the battery, reducing short-circuit risk in the battery and improving high-temperature life of the battery.

17 Claims, 1 Drawing Sheet

(51) Int. Cl.
*H01M 4/133* (2010.01)
*H01M 4/1393* (2010.01)
*H01M 4/36* (2006.01)
*H01M 4/04* (2006.01)
*H01M 10/0525* (2010.01)
*H01M 10/42* (2006.01)
*H01M 4/587* (2010.01)
*H01M 4/139* (2010.01)
*H01M 2/16* (2006.01)
*H01M 4/02* (2006.01)
*H01M 4/38* (2006.01)
*H01M 4/583* (2010.01)
*H01M 4/40* (2006.01)
*H01M 4/134* (2010.01)
*H01M 4/1395* (2010.01)

(52) U.S. Cl.
CPC ....... *H01M 4/0404* (2013.01); *H01M 4/0421* (2013.01); *H01M 4/0423* (2013.01); *H01M 4/13* (2013.01); *H01M 4/133* (2013.01); *H01M 4/139* (2013.01); *H01M 4/1393* (2013.01); *H01M 4/366* (2013.01); *H01M 4/587* (2013.01); *H01M 10/0525* (2013.01); *H01M 10/4235* (2013.01); *H01M 4/0428* (2013.01); *H01M 4/134* (2013.01); *H01M 4/1395* (2013.01); *H01M 4/382* (2013.01); *H01M 4/386* (2013.01); *H01M 4/405* (2013.01); *H01M 4/583* (2013.01); *H01M 2004/021* (2013.01); *H01M 2004/027* (2013.01)

(58) Field of Classification Search
CPC ........ H01M 4/13; H01M 4/133; H01M 4/139; H01M 4/134; H01M 4/1393; H01M 4/366; H01M 4/587; H01M 4/1395; H01M 4/382; H01M 4/386; H01M 4/405; H01M 4/583; H01M 2/1646; H01M 2/1673; H01M 10/052; H01M 10/0525; H01M 10/4235; H01M 2004/021; H01M 2004/027

See application file for complete search history.

(56) References Cited

U.S. PATENT DOCUMENTS

| | | | |
|---|---|---|---|
| 2012/0201860 A1* | 8/2012 | Weimer | B01J 31/38 424/400 |
| 2014/0027259 A1 | 1/2014 | Kawana et al. | |
| 2015/0180023 A1† | 6/2015 | Xiao | |
| 2016/0351973 A1* | 12/2016 | Albano | H01M 10/0525 |
| 2017/0170515 A1† | 6/2017 | Yushin | |
| 2017/0338475 A1 | 11/2017 | Laramie et al. | |

\* cited by examiner
† cited by third party

NEGATIVE ELECTRODE, METHOD FOR PREPARING THE SAME AND ELECTROCHEMICAL DEVICE FOR PROLONGING SERVICE LIFE OF BATTERY AND REDUCING SHORT-CIRCUIT RISK

CROSS-REFERENCE TO RELATED APPLICATIONS

The present application claims priority to Chinese Patent Application No. 201711387971.6, filed on Dec. 20, 2017, the content of which is incorporated herein by reference in its entirety.

TECHNICAL FIELD

The present disclosure relates to the field of energy storage, and particularly, to a negative electrode, a method for preparing the negative electrode and an electrochemical device.

BACKGROUND

Lithium-ion batteries have become the main energy source for various consumer electronics, power products, and energy storages and are applied in various aspects of daily life, because they have characters of high working voltage, high energy density, no memory effect, environmental protection and the like. In recent years, the requirements of the market, especially the power battery market, on the battery energy density and charging efficiency are getting higher and higher, so that high-capacity silicon negative electrodes and fast charging technologies have developed rapidly.

However, at the negative electrode, heat is accumulated during the lithium-intercalation reaction and the diffusion ability of lithium ions is limited. Therefore, when high-density lithium ions (>2 C) rapidly intercalating into the negative electrode, it not only leads to an increased side reaction between the electrolyte and the negative electrode, resulting in increased thickness of SEI and electrolyte decomposition gas, but also increases the risk of lithium precipitation, and eventually resulting in a rapid decline of battery capacity and a decrease in battery safety performance. In addition, when the battery is stored or used at a high temperature, the side reaction between the electrolyte and the negative electrode is intensified, and further exacerbates gas production of the battery and the irreversible capacity loss of the battery, resulting in a premature termination of the battery service life. As regards lithium metal batteries, even a low density of lithium ions (for example, 0.5 C) can cause a formation of dendritic crystal on the lithium metal surface, increasing the risk of short circuit within the battery.

Therefore, whether it is a lithium metal, a silicon-containing negative electrode, or a graphite negative electrode, it is necessary to reduce side reactions and avoid lithium precipitation.

SUMMARY

A first aspect of the present disclosure provides a negative electrode. The negative electrode includes a current collector and a negative electrode active material layer disposed on at least one surface of the current collector and comprising a negative electrode active material. A porous inorganic dielectric layer is provided on a surface of the at least one negative electrode active material layer away from the current collector. A thickness of the porous inorganic dielectric layer is in a range of 20 nm-2000 nm, mass per unit area of the porous inorganic dielectric layer is in a range of 0.03 $g/m^2$-7.0 $g/m^2$, and the porous inorganic dielectric layer contains no binder.

A second aspect of the present disclosure provides a method of preparing the negative electrode, and the preparing method at least includes steps of: preparing a negative electrode active material layer on at least one surface of a current collector; and preparing a porous inorganic dielectric layer on a surface of the negative electrode active material layer away from the current collector by means of vapor deposition. A thickness of the porous inorganic dielectric layer is in a range of 20 nm-2000 nm, mass per unit area of the porous inorganic dielectric layer is in a range of 0.03 $g/m^2$-7.0 $g/m^2$, and the porous inorganic dielectric layer contains no binder.

A third aspect of the present disclosure provides an electrochemical device including the above-mentioned negative electrode.

Technical solutions of the present disclosure at least have the following beneficial effects: the negative electrode provided by the present disclosure can alleviate the lithium precipitation on the negative electrode surface during large-current charging, stabilize the negative electrode interface, and alleviate the side reaction between the negative electrode and the electrolyte, thereby improving the cycle life of battery, reducing the short-circuit risk in the battery and improving the high-temperature life of the battery.

REFERENCE SIGNS

1—current collector;
2—negative electrode active material layer;
3—porous inorganic dielectric layer;
  31—first porous inorganic layer;
  32—second porous inorganic layer.

DESCRIPTION OF EMBODIMENTS

The present disclosure will be further illustrated by means of the following embodiments and comparative examples. These embodiments are merely for illustrating the present disclosure, but not intended to limit the present disclosure. Without departing from the scope of the technical solutions of the present disclosure, any modification or equivalent substitution with respect to the technical solutions of the present disclosure shall be included in the protection scope of the present disclosure.

The present disclosure provides a negative electrode, a method of preparing the negative electrode and an electrochemical device.

Firstly, a negative electrode according to a first aspect of the present disclosure will be described.

The negative electrode according to the first aspect of the present disclosure includes a current collector and a negative electrode active material layer disposed on at least one surface of the current collector and containing a negative electrode active material. A porous inorganic dielectric layer is disposed on a surface of the at least one negative electrode active material layer away from the current collector. A thickness of the porous inorganic dielectric layer is 20 nm-2000 nm, mass per unit area of the porous inorganic dielectric layer is 0.03 $g/m^2$-7.0 $g/m^2$, and the porous inorganic dielectric layer contains no binder.

The mass per unit area of the porous inorganic dielectric layer is determined by a weight difference method. Before preparing the inorganic dielectric layer with vapor deposition method, the negative electrode is taken for adjusting the processing parameters. The electrode is cut into 20 pieces of 50 mm×50 mm square pieces, and the mass of each piece is accurately weighed using a six-digit precision balance so as to calculate an average value used as the mass of the initial negative electrode piece, which is denoted as m0; after the equipment parameters are determined, a porous inorganic dielectric layer is deposited on the negative electrode, and the negative electrode deposited with the porous inorganic dielectric layer is cut into 20 pieces of 50 mm×50 mm square pieces, and the mass of each piece is weighed so as to calculate an average value, which is denoted as m1. Therefore, the mass per unit area of the porous inorganic dielectric layer is equal to (m1−m0)/25 $cm^2$.

Figure 1:
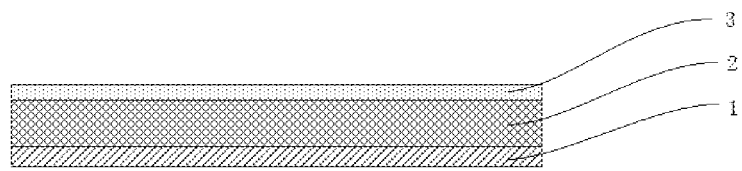
FIG. 1 is a structural schematic diagram of a negative electrode active material layer provided by an embodiment of the present disclosure.
Figure 2:
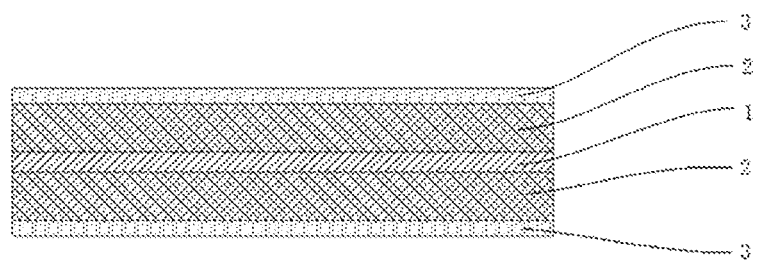
FIG. 2 is a structural schematic diagram of another negative electrode active material layer provided by an embodiment of the present disclosure.
Figure 3:
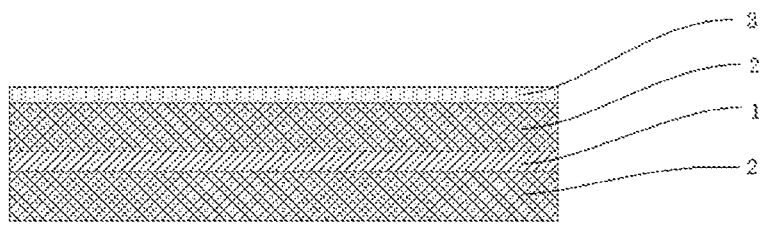
FIG. 3 is a structural schematic diagram of another negative electrode active material layer provided by an embodiment of the present disclosure.

The structural schematic diagrams of the negative electrodes according to the embodiments of the present disclosure are shown in FIGS. 1 to 3. In FIG. 1, a negative electrode active material layer 2 is provided on one surface of a current collector 1, and a negative electrode dielectric layer 3 is provided on a surface of negative electrode active material layer 2. In both FIG. 2 and FIG. 3, a negative electrode active material layer 2 is provided on each surface of a current collector 1. In the negative electrode shown in FIG. 2, a porous inorganic dielectric layer 3 is provided on a surface of each negative electrode active material layers 2. In the negative electrode shown in FIG. 3, a porous inorganic dielectric layer 3 is provided on a surface of only one negative electrode active material layer 2.

In the embodiments of the present disclosure, the porous inorganic dielectric layer is provided on the surface of the negative electrode active material layer. Firstly, the porous inorganic dielectric layer has a small thickness of 20 nm-2000 nm, and thus the electrolyte can be insulated from the negative electrode active material almost without changing the thickness of the negative electrode, thereby avoiding side reactions at the interface between the electrolyte and the negative electrode under conditions of high temperature and rapid charging, i.e., the porous inorganic dielectric layer realize a function of an artificial SEI membrane, effectively suppressing gas production of the electrolyte decomposition. Secondly, in the embodiments, the porous inorganic dielectric layer has a porous structure, which does not affect the intercalation and deintercalation of lithium ions while stabilizing the negative electrode interface during charging and discharging with large-current, and thus can effectively alleviate the lithium precipitation on the negative electrode surface during large-current charging. Thirdly, in the embodiments, the porous inorganic dielectric layer has a dielectric property, that is, it has a non-conductive property under the effect of an external electric field, thereby stabilizing the negative electrode interface and reducing side reactions between the negative electrode and electrolyte. Fourthly, the porous inorganic dielectric layer contains no binder, i.e., an adhesion with the negative electrode active material layer does not depend on a binder, so that the porous inorganic dielectric layer on the negative electrode active material layer is prevented from detaching due to the swelling failure of the binder during the cycling process.

An upper limit of the thickness of the porous inorganic dielectric layer may be 2000 nm, 1990 nm, 1950 nm, 1900 nm, 1850 nm, 1800 nm, 1750 nm, 1720 nm, 1700 nm, 1680 nm, 1650 nm, 1600 nm, 1550 nm, 1500 nm, 1450 nm, 1400 nm, 1350 nm, 1300 nm, 1250 nm, 1200 nm, 1150 nm, 1100 nm, 1050 nm, 1000 nm, 990 nm, 950 nm, 900 nm, 850 nm, 800 nm, 750 nm, 720 nm, 700 nm, 680 nm, 650 nm, 600 nm, 550 nm, 500 nm, 490 nm, 450 nm, 430 nm, 400 nm, 380 nm, 350 nm, 300 nm. A lower limit of the thickness of the porous inorganic dielectric layer may be 1 nm, 5 nm, 10 nm, 12 nm, 15 nm, 20 nm, 30 nm, 40 nm, 43 nm, 45 nm, 50 nm, 55 nm, 60 nm, 70 nm, 80 nm, 90 nm, 100 nm, 110 nm, 150 nm, 200 nm, 250 nm, 280 nm. A width range of the porous inorganic dielectric layer is a combination consisting of any one upper limit and any one lower limit. When the porous inorganic dielectric layer is extremely thin, it cannot effectively protect the negative electrode active material layer. When the porous inorganic dielectric layer is extremely thick, it will affect the intercalation and deintercalation of ions at the negative electrode and the battery's rate performance, and also reduce the battery's energy density.

As a preferable embodiment, the thickness of the porous inorganic dielectric layer is in a range of 30 nm-1000 nm, and preferably, in a range of 50 nm-500 nm.

In the embodiments of the present disclosure, the mass per unit area of the porous inorganic dielectric layer is 0.03 $g/m^2$-7.0 $g/m^2$. The mass per unit area of the porous inorganic dielectric layer is dependent on parameters such as the thickness of the porous inorganic dielectric layer, the porosity of the porous inorganic dielectric layer, the pore-diameter of the porous inorganic dielectric layer, and the like. Therefore, merely controlling the thickness of the porous inorganic dielectric layer cannot fundamentally guarantee that the active material on the surface of the negative electrode active material layer is effectively insulated from the electrolyte. In the present disclosure, it is found that, by controlling the mass of the porous inorganic dielectric layer, the active material on the surface of the negative electrode active material layer can be effectively insulated from the electrolyte, thereby effectively guaranteeing the dynamic performance of the battery. When the mass per unit area of the inorganic layer is extremely small, the surface of the negative electrode active material layer has a relatively small amount of dielectric material, so that the negative electrode active material layer is likely to be partially dissolved by reacting with the HF in the electrolyte, thereby affecting the subsequent performance optimization. When the mass per unit area of the inorganic layer is extremely large, it is likely to reduce the porosity of the inorganic layer, thereby negatively affecting the intercalating of lithium ions into the active material layer, and thus deteriorating the dynamic performance.

In a preferred embodiment, the porous inorganic dielectric layer has pores for ion transmission. In microscopic observation, the porous inorganic dielectric layer is a porous structure formed by stacked nanoclusters, and the pores between the nanoclusters constitute channels for ion transmission. An average pore diameter of the porous inorganic dielectric layer is in a range of 0.1 nm-20 nm. If the average pore-diameter is extremely small, the ion transmission performance is easily to be affected, which has negative influence on the dynamic performance of the battery. If the average pore diameter is extremely large, on basis of guaranteeing the abovementioned porosity, the structure of the porous inorganic dielectric layer is extremely loose and easily to collapse, so that the porous inorganic dielectric layer will have poor mechanical properties, thereby reducing the battery's reliability during long-term use.

In a preferred embodiment, the porosity of the porous inorganic dielectric layer is 10%-70%. An upper limit of the porosity of the porous inorganic dielectric layer can be 70%, 68%, 65%, 60%, 55%, 50%, 45%, or 42%. A lower limit of the porosity of the porous inorganic dielectric layer can be 10%, 15%, 20%, 22%, 25%, 28%, 30%, 35%, or 40%. A range of the porosity of the porous inorganic dielectric layer is a combination consisting of any one upper limit and any one lower limit. In microscopic observation, the porous inorganic dielectric layer according to the embodiments of the present disclosure is formed by disorderly stacking of a plurality of nanoclusters, and the gaps among the nanoclusters constitute pores for ion transmission. If the porosity is extremely small, the ion transmission performance can be easily affected, and the dynamic performance of the battery also can be adversely effected. If the porosity is extremely large, a relatively larger contact area between the electrolyte and the negative electrode active material leads to an insufficient effect of suppressing the side reactions of the electrolyte, and the structure of the porous inorganic dielectric layer can be extremely loose, so that the porous inorganic dielectric layer will have poor mechanical properties, thereby reducing the battery's reliability during long-term use.

The method of measuring the porosity of the porous inorganic dielectric layer is as follows: a substrate is cut out into two initial substrate membranes with a same area, one of which is untreated, and the other one of which is prepared with a porous inorganic dielectric layer; the two samples mentioned above are respectively dried in a vacuum oven at 105° C. for 2 h, and then placed in a desiccator for cooling and then for measuring; the samples are wrapped with A4 papers and flattened on a die, punched with a punching machine, so as to make the sample to be ready for measuring; the thicknesses of the samples are firstly measured by a micrometer to calculate an apparent volume of each sample based on a surface area and thickness of each sample, and the apparent volume of the untreated substrate and the apparent volume of the porous substrate prepared with the porous inorganic dielectric layer are respectively denoted as V1 and V2; then the real volume of each sample is measured by an AccuPyc II densitometer, and the real volume of the untreated substrate and the real volume of the substrate prepared with the porous inorganic dielectric layer are respectively denoted as V3 and V4. It can be conducted that the porosity of the inorganic layer is equal to [V2−V4−(V1−V3)]/(V2−V1)×100%.

In an embodiment, the porosity of the porous inorganic dielectric layer is 20%-40%.

Figure 4:
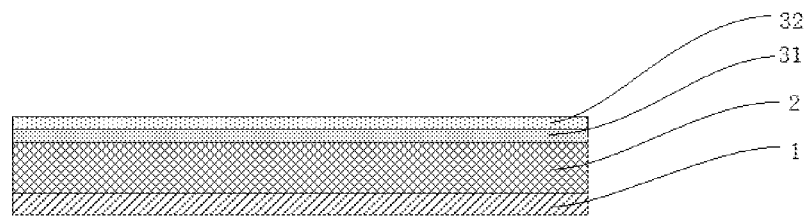
FIG. 4 is a structural schematic diagram of another negative electrode active material layer provided by an embodiment of the present disclosure.

In a preferred embodiment, the porous inorganic dielectric layer is a multi-layered composite structure at least including a first porous inorganic layer disposed on a surface of the negative electrode active material layer, and a second porous inorganic layer disposed on a surface of the first porous inorganic layer away from the negative electrode active material layer. The structural schematic diagram of the porous inorganic dielectric layer is shown as FIG. 4. In FIG. 4, a negative electrode active material layer 2 is disposed on a surface of a current collector 1, a first porous inorganic layer 31 and a second porous inorganic layer 32 are sequentially disposed on a surface of the negative electrode active material layer 2.

In a preferred embodiment, an average pore-diameter of the second porous inorganic layer is larger than or equal to an average pore diameter of the first porous inorganic layer. Such surface structure facilitates an entering of the electrolyte into the electrode, improves the dynamic performance of the battery, and further avoids side reactions of the electrolyte on the negative electrode active material, thereby optimizing the interface stability of the battery, and suppressing the lithium precipitation.

In a preferred embodiment, the first porous inorganic layer is continuously distributed on the surface of the negative electrode active material layer, and the second porous inorganic layer is a lamellar or island structure distributed on a surface of the first porous inorganic layer away from the negative electrode active material layer. With such a structure, a contact between the electrolyte and the negative electrode active material can be avoided, and a surface roughness of the electrode is increased, the porosity of the surface layer is increased, and the particle transmission is facilitated.

In a preferred embodiment, the porous inorganic dielectric layer is manufactured using a vapor deposition method, in which activated gas molecules are bonded to the negative electrode active material layer by chemical bonds. Therefore, the formed porous inorganic dielectric layer has a relatively strong bonding force with the negative electrode active material layer, and thus unlikely to detach. In this way, a deterioration of electrical properties and safety risks caused by the detachment of the inorganic particles can be avoided during long-term cycling and mechanical abuse. Meanwhile, the surface of the negative electrode active material layer is smooth after cold pressing, so that the porous inorganic dielectric layer has a good homogeneity on the surface of the negative electrode active material layer, and a thickness deviation can be controlled within ±5%.

Specifically, the vapor deposition method includes Atomic Layer Deposition (ALD), Chemical Vapor Deposition (CVD), Physical Vapor Deposition (PVD), and Thermal Evaporation Deposition. Preferably, it may adopt a plasma assistance thermal evaporation deposition method, a reaction ion beam sputtering deposition method, an electron beam evaporation method, a magnetron sputtering method, or a plasma arc deposition method.

In a preferred embodiment, the porous inorganic dielectric layer contains $AlO_x$, wherein $1.35 \leq x \leq 1.54$, and preferably, x is within a range of 1.45-1.5. The specific x can be calculated by precisely analyzing the element contents of Al and O in the inorganic layer with X-ray photoelectron spectroscopy (XPS) technique. In a case of using the porous inorganic dielectric layer formed by the vapor deposition, since the negative electrode active material layer contains a binder and a negative electrode active material, it cannot be heated at a high temperature due to its poor heat resistance, and it is difficult to obtain $Al_2O_3$ membrane with an ideal stoichiometric ratio, while the chemical properties of $AlO_x$ are closely related to the stoichiometric ratio of O/Al. When the O/Al adopts a substoichiometric or hyperstoichiometric dose, it easily leads to an excessive oxygen vacancy or oxygen active ions in the membrane, affecting the dielectric property and corrosion resistance of the alumina membrane. In the embodiments of the present disclosure, O/Al value of $AlO_x$ is in a range of 1.45-1.55, which guarantees that the porous inorganic dielectric layer on the outside of the negative electrode has a high dielectric property, high hardness, and a strong corrosion resistance.

In a preferred embodiment, in the porous inorganic dielectric layer, the mass of $AlO_x$ accounts for 50%-100%, and preferably 80%-100% of the total mass of the porous inorganic dielectric layer. Alumina has the advantages of stable chemical properties, strong mechanical strength, good thermal conductivity, and good insulation property. Therefore, in the embodiments of the present disclosure, alumina is the main inorganic material of the porous inorganic dielectric layer on the negative electrode surface.

Specifically, the porous oxide dielectric layer also contains at least one selected from a group consisting of silicon oxide, silicon nitride, silicon fluoride, titanium oxide, titanium nitride, titanium fluoride, zinc oxide, zinc nitride, zinc fluoride, magnesium oxide, magnesium nitride, magnesium fluoride, zirconium oxide, zirconium nitride, zirconium fluoride, calcium oxide, calcium nitride, calcium fluoride, barium oxide, barium nitride, or barium fluoride, in order to adjust the dielectric property, mechanical strength and microscopic morphology of the porous inorganic dielectric layer.

Preferable are silicon oxide, titanium oxide, magnesium oxide, zirconium oxide, calcium oxide, zinc oxide, barium oxide, and silicon nitride.

In a preferred embodiment, the negative electrode active material includes at least one of natural graphite, artificial graphite, soft carbon, hard carbon, silicon, silicon-oxygen composite, silicon-carbon composite, or lithium metal.

The silicon oxide refers to $SiO_x$, x<2, including silicon monoxide and the like. The silicon-carbon composite refers to carbon-coated silicon material, carbon-coated silicon-oxygen composite, or mixture consisting of at least one of silicon material and silicon-oxygen composite and at least one of graphite, soft carbon, or hard carbon.

According to a second aspect of the present disclosure, a method of preparing the negative electrode will be described as follows.

The preparing method according to the second aspect of the present disclosure at least includes following steps: preparing a negative electrode active material layer on at least one surface of a current collector; and preparing a porous inorganic dielectric layer on a surface of the negative electrode active material layer away from the current collector by means of a vapor deposition method. The porous inorganic dielectric layer has a thickness of 20 nm-2000 nm, the porous inorganic dielectric layer contains no binder, and mass per unit area of the porous inorganic dielectric layer is in a range of 0.03 g/m$^2$-7.0 g/m$^2$.

In an embodiment, the step of preparing the negative electrode active material layer includes one of the following manners.

Manner 1: A negative electrode active material, a binder, and a conductive agent are mixed to form negative electrode slurry; and the negative electrode slurry is prepared on a surface of the current collector, so as to obtain a negative electrode active material layer.

Manner 2: A lithium foil is manufactured on the current collector, so as to obtain a negative electrode active material layer.

Specifically, in Manner 1, the negative electrode slurry is coated or sprayed on the surface of the current collector, and the negative electrode active material layer is obtained after the steps of baking, cold pressing, slicing, and drying. In Manner 2, the lithium foil is pressed onto the current collector with a certain thickness or mass, so as to obtain the negative electrode active material layer.

The vapor deposition method includes Atomic Layer Deposition (ALD), Chemical Vapor Deposition (CVD), Physical Vapor Deposition (PVD), and Thermal Evaporation Deposition. Preferably, it may adopt a plasma assistance thermal evaporation deposition method, a reaction ion beam sputtering deposition method, an electron beam evaporation method, a magnetron sputtering method, or a plasma arc deposition method.

When the porous inorganic dielectric layer is manufactured by using the thermal evaporation deposition method, the following steps are included.

Step (1), evacuating a deposition chamber to a pressure of 0.001 Pa or less.

Step (2), introducing a reactive gas 'a' into the deposition chamber.

Step (3), heating a precursor 'b' of the porous inorganic dielectric layer to a gaseous precursor in a heating chamber, and then introducing the gaseous precursor into the deposition chamber.

Step (4): in the deposition chamber, adjusting gas concentration, temperature and deposition distance, so that the reactive gas 'a' chemically reacts with the gaseous precursor 'b' to form the porous inorganic dielectric layer on a surface of the negative electrode active material layer.

The reactive gas 'a' can be selected from a group consisting of oxygen, ozone, carbon dioxide, water vapor, nitrogen, nitric oxide, nitrogen dioxide, ammonia, or combinations thereof. The corresponding precursor b of the inorganic material can be selected from a group consisting of pure metal element, alloy, metal alkyl compound, metal nitrate compound, metal acetate compound, metal sulfuric acid of Al, Si, Ti, Zn, Mg, Zr, Ca, Zn, Ba, or combinations thereof.

An electrochemical device according to a third aspect of the present disclosure will be described as follows. The electrochemical device of the present disclosure is one of a lithium-ion secondary battery, a lithium primary battery, a sodium ion battery, or a magnesium ion battery, but not limited to these.

In the following, a lithium-ion secondary battery is taken as an example for further describing the embodiments of the present disclosure.

The lithium-ion secondary battery includes a positive electrode, a negative electrode, a separator, and an electrolyte, wherein the negative electrode is the negative electrode according to the first aspect of the present disclosure.

With respect to the negative electrode, the preparing method, and the lithium-ion secondary battery, embodiments according to the present disclosure and comparative examples will be described as follows.

In the embodiments of the present disclosure, the active material of the negative electrode can be selected from a group consisting of natural graphite, artificial graphite, soft carbon, hard carbon, silicon, silicon-oxygen composite, silicon-carbon composite, lithium metal, or combinations thereof, but not particularly limited. Specifically, the embodiments of the present disclosure take natural graphite as an example.

Preparing of Negative Electrode (1) Artificial graphite as a negative electrode active material, acetylene black as a conductive agent, styrene butadiene rubber (SBR) as a binder, and carboxyl methyl cellulose (CMC) as a thickener are mixed together in a weight ratio of 96:1:2:1, and deionized water as the solvent is added therein, and then a negative electrode slurry is obtained after stirring and mixing evenly;

(2) The negative electrode slurry is evenly coated on a copper foil of the current collector, followed by drying at 80° C.–90° C., it is cold pressed, trimmed, cut into pieces, and divided into strips, and then dried in vacuum at 110° C. for 4 h;

(3) The preparing method of the porous inorganic dielectric layer takes plasma assistance thermal evaporation deposition technology as an example: the heating source is an electron beam, the heating target material is a pure element (such as Al, Si, Mg, etc.) contained in the porous inorganic dielectric layer other than oxygen. Under a vacuum condition, an oxygen-containing active gas (such as oxygen, ozone, oxygen ion, nitric oxide, nitrogen dioxide, carbon dioxide, water vapor, etc.) is used as a reaction gas for controlling the substrate material temperature to be lower than 100° C. By adjusting electron beam voltage (6 kV~12 kV), vacuum degree of a processing chamber ($10^{-1}$ Pa~$10^{-3}$ Pa), volume flow of oxygen (8000 sccm~12000 sccm), plasma power (300 W~600 W), and the processing time, a deposition rate of the porous inorganic dielectric layer on the surface of the negative electrode active material layer is adjusted, so that the thickness, the composition and the microscopic morphology of the porous inorganic dielectric layer are also adjusted.

Preparing of Positive Electrode

A positive electrode active material, acetylene black (SP) as a conductive agent, and polyvinylidene fluoride (PVDF) as a binder are mixed together in a weight ratio of 96:2:2. Then a solvent N-methylpyrrolidone is added, mixed and stirred evenly to obtain positive electrode slurry. The positive electrode slurry is evenly coated on an aluminum foil of the positive electrode current collector, followed by drying at a condition of 85° C., it is cold pressed, trimmed, cut into pieces, and divided into strips, and then dried in vacuum at 85° C. for 4 h, so as to obtain a positive electrode. The positive electrode active material used therein can be layered lithium transition metal oxide, lithium-rich manganese-based oxide, lithium iron phosphate, lithium cobaltate, or positive electrode active material doped or coated thereby. In the embodiments of the present disclosure, the layered lithium transition metal oxide $LiNi_{0.8}Co_{0.1}Mn_{0.1}O_2$ is taken as an example.

Preparing of Electrolyte

A basic electrolyte, including dimethyl carbonate (DMC), ethyl methyl carbonate (EMC), and ethylene carbonate (EC) in a mass ratio of 5:2:3, is prepared. And then an electrolyte salt is added therein until the concentration of lithium hexafluorophosphate in the electrolyte is 1 mol/L.

Preparing of Lithium-Ion Secondary Battery

The negative electrode, the separator, and the positive electrode are sequentially stacked, wherein the separator is in disposed between the positive electrode and the negative electrode, and the coating on the surface of the separator is toward the positive electrode.

Then, they are wound into a square bare battery with a thickness of 8 mm, a width of 60 mm, and a length of 130 mm. The bare battery is then packed into an packing bag made of aluminum foil, dried at 75° C. in vacuum for 10 h, a nonaqueous electrolyte is added therein, followed by vacuum-packing and standing for 24 h. The battery is charged with a constant current of 0.1 C (160 mA) to 4.2V, and charged with a constant voltage of 4.2V until the current is decreased to 0.05 C (80 mA). Then, the battery is discharged with a constant current of 0.1 C (160 mA) to 3.0 V. The charging and discharging are repeated for 2 times, and finally it is charged with a constant current of 0.1 C (160 mA) to 3.8V, so as to finish the preparing of the lithium-ion secondary battery.

Embodiments

In the lithium-ion secondary battery manufactured by the above-mentioned method, specifically, by the plasma assistance thermal evaporation deposition technology, a porous inorganic dielectric layer with certain parameters is respectively prepared on the upper and lower surfaces of the negative electrode active material layer by means of vapor deposition method.

In an embodiment of a double-layered porous inorganic dielectric layer, a first porous inorganic layer and a second porous inorganic layer having different porosities and thicknesses are respectively deposited by means of the plasma assistance thermal evaporation deposition technique.

The specific process parameters are as follows: the target material is aluminum metal (that may be doped with other elements, such as Si), the vacuum degree of the deposition chamber is lower than $1 \times 10^{-3}$ Pa, the target material heating temperature is in a range of 600° C.–650° C., the oxygen volume flow is 300 sccm, and the plasma power is approximately 300 W, and the processing time is 5 min.

By observing under an electron microscope, it is found that the manufactured porous alumina layer is formed by stacked nanoclusters, wherein a plurality of gaps between particles constitutes pores. An average pore diameter of the pores is measured.

The specific parameters of the manufactured negative electrode active material layer are shown in Table 1.

Comparative Examples

A negative electrode D1 is obtained by preparing a negative electrode active material layer without an inorganic layer. A negative electrode D2 is obtained by depositing a dense, non-porous inorganic layer on the surface of the negative electrode active material layer with the vapor deposition method, in which the deposition rate and the substrate temperature are reduced. A negative electrode D3 is obtained by coating the surface of the negative electrode active material layer with a mixture consisting of alumina powder and polyacrylic acid binder or carboxymethyl cellulose binder, in which binder content is 50%.

The specific parameters of the manufactured negative electrode active material layer according to the comparative examples are shown in Table 1.

TABLE 1

| No. | Structure of Porous Inorganic Dielectric Layer | Composition | Thickness | Mass per Unit Area of the Porous Inorganic Dielectric Layer (g/m$^2$) | Porosity | Average Pore-diameter (nm) |
| --- | --- | --- | --- | --- | --- | --- |
| Negative electrode 1 | Single-layered | AlO$_{1.48}$ | 20 nm | 0.06 | 40.5% | 3.3 |
| Negative electrode 2 | Single-layered | AlO$_{1.48}$ | 30 nm | 0.09 | 40.2% | 4 |

TABLE 1-continued

| No. | Structure of Porous Inorganic Dielectric Layer | Composition | Thickness | Mass per Unit Area of the Porous Inorganic Dielectric Layer (g/m²) | Porosity | Average Pore-diameter (nm) |
|---|---|---|---|---|---|---|
| Negative electrode 3 | Single-layered | $AlO_{1.49}$ | 50 nm | 0.15 | 40.4% | 3.7 |
| Negative electrode 4 | Single-layered | $AlO_{1.5}$ | 500 nm | 1.56 | 40.2% | 11.2 |
| Negative electrode 5 | Single-layered | $AlO_{1.5}$ | 1000 nm | 2.99 | 40.5% | 19.1 |
| Negative electrode 6 | Single-layered | $AlO_{1.5}$ | 2000 nm | 6.13 | 39.5% | 13.4 |
| Negative electrode 7 | Double-layered: two evenly distributed layers | $AlO_{1.49}$ | 200 nm + 300 nm | 1.51 | 40.5% | 18.4/9.1 |
| Negative electrode 8 | Double-layered: an evenly distributed bottom layer; an island structure distributed top layer | $AlO_{1.49}$ | 200 nm + 300 nm | 1.47 | 40.7% | 11.9 |
| Negative electrode 9 | Double-layered: an evenly distributed bottom layer; an island structure distributed top layer | $AlO_{1.48}$ + $SiO_{1.97}$ | 200 nm + 300 nm | 1.58 | 40.2% | 13.7 |
| Negative electrode 10 | Single-layered | $AlO_{1.48}$ | 10 nm | 0.03 | 39.7% | 4.7 |
| Negative electrode 11 | Single-layered | $AlO_{1.5}$ | 2200 nm | 6.65 | 39.4% | 14.4 |
| Negative electrode 12 | Single-layered | $AlO_{1.5}$ | 500 nm | 2.25 | 10.4% | 3.3 |
| Negative electrode 13 | Single-layered | $AlO_{1.5}$ | 500 nm | 1.99 | 20.1% | 15.1 |
| Negative electrode 14 | Single-layered | $AlO_{1.5}$ | 500 nm | 1.03 | 60.6% | 7.8 |
| Negative electrode 15 | Single-layered | $AlO_{1.49}$ | 500 nm | 0.77 | 69.6% | 5.7 |
| Negative electrode 16 | Single-layered | $AlO_{1.48}$ | 500 nm | 0.54 | 79.5% | 6.1 |
| Negative electrode 17 | Single-layered | $AlO_{1.5}$ | 500 nm | 2.32 | 7.1% | 23.2 |
| Negative electrode 18 | Single-layered | $AlO_{1.48}$ | 500 nm | 1.49 | 40.2% | 8.4 |
| Negative electrode D1 | — | — | — | — | — | — |
| Negative electrode D2 | Single-layered | $AlO_{1.48}$ | 500 nm | 2.55 | 0.0% | — |
| Negative electrode D3 | Single-layered | $AlO_{1.5}$ + binder | 500 nm | 2.48 | 0.0% | — |

In the negative electrodes 7 to 9, the thickness "200 nm+300 nm" of the porous inorganic dielectric layer indicates that the thickness of the first porous inorganic layer is 200 nm and the thickness of the second porous inorganic layer is 300 nm. In the negative electrode 7, the average pore diameter "18.4/9.1" indicates that the average pore diameter of the first porous inorganic layer is 18.4 nm and the average pore diameter of the second porous inorganic layer is 9.1 nm. In the negative electrode 8, the average pore diameter "11.9" indicates that both the average pore diameter of the first porous inorganic layer and the average pore diameter of the second porous inorganic layer are 11.9 nm. In the negative electrode 9, the average pore diameter "13.7" indicates that both the average pore diameter of the first porous inorganic layer and the average pore diameter of the second porous inorganic layer are 13.7 nm.

Finally, the measurement procedures and measurement results with respect to the separators and lithium-ion secondary batteries are described in the following.

(1) Test for Capacity of Lithium-Ion Secondary Battery

In an incubator with a constant temperature of 25° C., the battery is charged with a constant current of 0.5 C to reach a voltage of 4.2V, and then charged with a constant voltage of 4.2V until the current falls to 0.05 C, and then discharged with a constant current of 0.3 C to reach a voltage of 2.8V, the obtained discharge capacity is the battery capacity.

(2) Test for Capacity Retention Rate of Lithium-Ion Secondary Battery after High Temperature Cycles Under a condition of 25° C., the battery is charged with a constant current of 1 C to reach a voltage of 4.2V, and then charged with a constant voltage of 4.2V to reach a current of 0.05 C, and then discharged with a constant current of 1 C to reach a voltage of 2.8V. This charge-discharge cycle is repeated for 500 times.

The capacity retention rate after 1000 cycles=discharge capacity after the $1000^{th}$ cycle/discharge capacity after the first cycle×100%.

(3) Test for High Temperature Storage and Gas Generation

Each group has 5 batteries to be measured, and each of them is charged with a constant current of 0.3 C at a normal temperature to reach a voltage higher than 4.2V, and further charged with a constant voltage of 4.2V until the current is lower than 0.05 C, so as to make each of them in a state of fully charged at 4.2V. The internal pressure of each fully charged battery before storage is measured and recorded as $P_0$. Then, each fully charged battery is placed in an oven at 80° C., followed by being stored for 15 days and then taken out, after the battery is cooled for 1 h, the internal pressure of each battery after storage is measured and recorded as $P_n$.

According to a formula: $\Delta P=P_n-P_0$, the pressure change of the battery before and after storage can be calculated.

(4) Test for Overcharging

Each group has 10 batteries to be measured, and the batteries are displaced in a safety measurement box, the batteries are charged with 1 C to reach a voltage of 10V, followed by maintaining for 30 minutes. Then the temperature and voltage of batteries are recorded and it is observed whether the batteries fail and cause fire or explosion.

(5) Test for Lithium Precipitation

After the battery is fully charged with 1.5 C at normal temperature, the battery is disassembled to analyze lithium precipitation on the surface of the silicon anode.

The obtained measurement results are shown in Table 2:

TABLE 2

| No. | Battery Capacity | Capacity Retention Rate After 1000 Cycles (%) | Average Pressure Change (Mpa) | Overcharging Performance (The Number of Batteries Passed The Test/The Total Number of Batteries) | Lithium Precipitation |
|---|---|---|---|---|---|
| Negative electrode 1 | 2081.3 | 90.2 | 0.37 | 1/10 | No |
| Negative electrode 2 | 2070.5 | 89.9 | 0.31 | 3/10 | No |
| Negative electrode 3 | 2072.9 | 89.6 | 0.29 | 5/10 | No |
| Negative electrode 4 | 2083.1 | 90.5 | 0.13 | 10/10 | No |
| Negative electrode 5 | 2062.1 | 91.1 | 0.15 | 10/10 | No |
| Negative electrode 6 | 2063.8 | 86.1 | 0.09 | 10/10 | Partial |
| Negative electrode 7 | 2098.0 | 93.1 | 0.11 | 10/10 | No |
| Negative electrode 8 | 2062.4 | 91.7 | 0.12 | 9/10 | No |
| Negative electrode 9 | 2102.9 | 91.1 | 0.14 | 9/10 | No |
| Negative electrode 10 | 2089.6 | 89.9 | 0.43 | 0/10 | No |
| Negative electrode 11 | 2087.7 | 87.2 | 0.11 | 10/10 | Slight |
| Negative electrode 12 | 2098.0 | 87.6 | 0.14 | 7/10 | Slight |
| Negative electrode 13 | 2053.1 | 89.1 | 0.17 | 5/10 | Partial and Slight |
| Negative electrode 14 | 2064.4 | 90.8 | 0.29 | 9/10 | No |
| Negative electrode 15 | 2073.2 | 91.4 | 0.25 | 7/10 | No |
| Negative electrode 16 | 2077.5 | 90.8 | 0.29 | 7/10 | No |
| Negative electrode 17 | 2069.4 | 85.3 | 0.44 | 6/10 | Partial and Slight |
| Negative electrode 18 | 2048.7 | 89.3 | 0.16 | 10/10 | No |
| Negative electrode D1 | 2093.3 | 88.7 | 0.45 | 0/10 | Slight in Folded Portion |
| Negative electrode D2 | 1431.7 | 61.5 | 0.41 | 9/10 | Serious |
| Negative electrode D3 | 1618.5 | 63.4 | 0.23 | 8/10 | Serious |

With respect to the negative electrodes according to the comparative examples, the negative electrode without the porous inorganic dielectric layer has significantly lower measurement results about cycling performance, high-temperature storage performance, safety performance, and lithium precipitation phenomenon than that of the negative electrodes according to the embodiments of the present disclosure. If the inorganic dielectric layer on the surface of the negative electrode is a non-porous structure, the cycling performance, high-temperature storage performance, and lithium precipitation phenomenon all further deteriorated, even the safety performance was improved. If the inorganic dielectric layer is provided on the surface of the negative electrode by a binder, the cycling performance, although the safety performance was improved to some extent, the high-temperature storage performance, and lithium precipitation phenomenon all further deteriorated.

In addition, with respect to the negative electrodes 8 to 9, the double-layered porous inorganic dielectric layer can further improve the cycling performance and high-temperature storage performance of the battery.

The present application is disclosed in preferred embodiments as above description. However, these preferred embodiments are not intended to limit the Claims. Any skilled in the art may make possible changes and modifications without departing from the concept of the present disclosure. The protection scope of the present disclosure shall be based on the scope defined by the Claims.

What is claimed is:

1. A negative electrode, comprising:
   a current collector, and
   a negative electrode active material layer disposed on at least one surface of the current collector and comprising a negative electrode active material,
   wherein a porous inorganic dielectric layer is provided on a surface of the at least one negative electrode active material layer away from the current collector, and the porous inorganic dielectric layer is manufactured by vapor-depositing an inorganic dielectric material of the porous inorganic dielectric layer, wherein a thickness of the porous inorganic dielectric layer is in a range of 20 nm-2000 nm, mass of the deposited inorganic dielectric material per unit area of the negative electrode is in a range of 0.03 g/m$^2$-7.0 g/m$^2$, and the porous inorganic dielectric layer contains no binder, and
   wherein the porous inorganic dielectric layer contains AlO$_x$, and x satisfies $1.35 \leq x \leq 1.54$.

2. The negative electrode according to claim 1, wherein the thickness of the porous inorganic dielectric layer is in a range of 30 nm-1000 nm.

3. The negative electrode according to claim 1, wherein the porous inorganic dielectric layer is a porous structure formed by stacked nanoclusters, pores between the nanoclusters constitute channels for ion transmission, and the pores have an average pore-diameter of 0.1 nm-20 nm.

4. The negative electrode according to claim 1, wherein the porous inorganic dielectric layer has a porosity of 10%-70%.

5. The negative electrode according to claim 1, wherein the porous inorganic dielectric layer is a multi-layered composite structure at least comprising a first porous inorganic layer disposed on a surface of the negative electrode active material layer, and a second porous inorganic layer disposed on a surface of the first porous inorganic layer away from the negative electrode active material layer.

6. The negative electrode according to claim 5, wherein an average pore-diameter of the second porous inorganic layer is larger than or equal to an average pore-diameter of the first porous inorganic layer.

7. The negative electrode according to claim 5, wherein the first porous inorganic layer is continuously distributed on the surface of the negative electrode active material layer, and the second porous inorganic layer is a lamellar or island structure distributed on a surface of the first porous inorganic layer away from the negative electrode active material layer.

8. The negative electrode according to claim 1, wherein the porous inorganic dielectric layer is manufactured by atomic layer deposition method, chemical vapor deposition, physical vapor deposition, thermal evaporation method, or combinations thereof.

9. The negative electrode according to claim 1, wherein
a mass of the $AlO_x$ in the porous inorganic dielectric layer accounts for 50%-100% of a total mass of the porous inorganic dielectric layer; and
the porous inorganic dielectric layer further contains at least one selected from a group consisting of silicon oxide, silicon nitride, silicon fluoride, titanium oxide, titanium nitride, titanium fluoride, zinc oxide, zinc nitride, zinc fluoride, magnesium oxide, magnesium nitride, magnesium fluoride, zirconium oxide, zirconium nitride, zirconium fluoride, calcium oxide, calcium nitride, calcium fluoride, barium oxide, barium nitride, or barium fluoride.

10. The negative electrode according to claim 1, wherein the negative electrode active material is selected from a group consisting of natural graphite, artificial graphite, soft carbon, hard carbon, silicon, silicon-oxygen composite, silicon-carbon composite, lithium metal, or combinations thereof.

11. The negative electrode according to claim 1, wherein the thickness of the porous inorganic dielectric layer is in a range of 50 nm-500 nm.

12. The negative electrode according to claim 1, wherein the porous inorganic dielectric layer has a porosity of 20%-40%.

13. The negative electrode according to claim 9, wherein the mass of the $AlO_x$ in the porous inorganic dielectric layer accounts for 80%-400% of a total mass of the porous inorganic dielectric layer.

14. An electrochemical device, comprising a positive electrode, a negative electrode, a separator, and an electrolyte, wherein the negative electrode is the negative electrode according to claim 1.

15. A method of preparing a negative electrode, at least comprising steps of:
preparing a negative electrode active material layer on at least one surface of a current collector; and
vapor-depositing an inorganic dielectric material of a porous inorganic dielectric layer on a surface of the negative electrode active material layer away from the current collector to form the porous inorganic dielectric layer,
wherein a thickness of the porous inorganic dielectric layer is in a range of 20 nm-2000 nm, mass of the deposited inorganic dielectric material per unit area of the negative electrode is in a range of 0.03 $g/m^2$-7.0 $g/m^2$, and the porous inorganic dielectric layer contains no binder, and
wherein the porous inorganic dielectric layer contains $AlO_x$, and x satisfies 1.35≤x≤1.54.

16. The method according to claim 15, wherein the step of preparing the negative electrode active material layer at least comprises one of the following manners:
manner 1: mixing a negative electrode active material, a binder, and a conductive agent to form negative electrode slurry, and preparing the negative electrode slurry on the surface of the current collector to obtain the negative electrode active material layer; and
manner 2: preparing a lithium foil on the current collector to obtain the negative electrode active material layer.

17. The method according to claim 15, wherein the step of vapor-depositing is at least one of atomic layer deposition, chemical vapor deposition, physical vapor deposition, and thermal evaporation method.

* * * * *